(12) United States Patent
Totsuka

(10) Patent No.: US 8,594,898 B2
(45) Date of Patent: Nov. 26, 2013

(54) CVT CONTROL APPARATUS

(75) Inventor: Hirohiko Totsuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 13/381,779

(22) PCT Filed: Jul. 5, 2010

(86) PCT No.: PCT/JP2010/061401
§ 371 (c)(1),
(2), (4) Date: Dec. 30, 2011

(87) PCT Pub. No.: WO2011/010547
PCT Pub. Date: Jan. 27, 2011

(65) Prior Publication Data
US 2012/0116637 A1 May 10, 2012

(30) Foreign Application Priority Data

Jul. 22, 2009 (JP) .................. 2009-170838
Jul. 22, 2009 (JP) .................. 2009-170839

(51) Int. Cl.
*B60W 10/02* (2006.01)
(52) U.S. Cl.
USPC ............ 701/60; 701/67; 477/39; 477/45; 477/171; 475/238
(58) Field of Classification Search
USPC ......... 701/51, 57–60, 65, 67–68; 477/34, 37, 477/39, 44, 45, 50, 70, 74, 76–77, 79, 86, 477/166, 171, 176; 475/238, 262, 309, 315, 475/321, 327; 192/28, 3.29, 85.19
See application file for complete search history.

(56) References Cited

U.S. PATENT DOCUMENTS

| 5,505,675 A | * | 4/1996 | Kuriyama et al. ........ 477/156 |
| 5,643,137 A | * | 7/1997 | Suzuki ..................... 477/169 |
| 5,667,457 A | * | 9/1997 | Kuriyama et al. ........ 477/156 |
| 5,674,155 A | * | 10/1997 | Otto et al. ................ 477/176 |

(Continued)

FOREIGN PATENT DOCUMENTS

| JP | 08-042676 A | 2/1996 |
| JP | 2004-251360 A | 9/2004 |

(Continued)

OTHER PUBLICATIONS

Japanese Notice of Allowance; Japanese Application No. 2011-523598 dated Jul. 10, 2013.

*Primary Examiner* — Thomas Black
*Assistant Examiner* — Ce Li
(74) *Attorney, Agent, or Firm* — Arent Fox LLP

(57) ABSTRACT

In an apparatus for controlling a belt type CVT connected to an engine (prime mover) mounted on a vehicle through a forward clutch to change power of the engine in speed and transmit the power to a driven wheel of the vehicle, it is configured to determine whether it is in a predetermined operating condition where an operator is likely to apply a panic brake or the like, set a first value as a friction coefficient μ of the clutch to calculate and control a desired supply hydraulic pressure based on the first value when the determination result is negative, and set a second value greater than the first value to calculate and control the desired supply hydraulic pressure based on the second value when the determination result is affirmative.

15 Claims, 10 Drawing Sheets

(56) References Cited

U.S. PATENT DOCUMENTS

| | | | |
|---|---|---|---|
| 6,094,614 A * | 7/2000 | Hiwatashi | 701/89 |
| 6,974,009 B2 * | 12/2005 | Hoshiya et al. | 192/3.63 |
| 7,074,148 B2 * | 7/2006 | Ishikawa et al. | 475/65 |
| 7,077,783 B2 * | 7/2006 | Senger et al. | 477/98 |
| 7,188,717 B2 * | 3/2007 | Hoshiya et al. | 192/3.63 |
| 7,309,067 B2 * | 12/2007 | Kita | 475/210 |
| 2001/0000338 A1 * | 4/2001 | IlJima | 477/62 |
| 2002/0082141 A1 * | 6/2002 | Senger et al. | 477/180 |
| 2003/0069682 A1 * | 4/2003 | Iwatsuki et al. | 701/51 |
| 2003/0125162 A1 * | 7/2003 | Senger et al. | 477/181 |
| 2003/0150683 A1 * | 8/2003 | Hoshiya et al. | 192/3.57 |
| 2004/0074734 A1 * | 4/2004 | Senger et al. | 192/109 F |
| 2004/0140174 A1 * | 7/2004 | Kano et al. | 192/104 R |
| 2005/0085340 A1 * | 4/2005 | Ishikawa et al. | 477/41 |
| 2005/0197233 A1 * | 9/2005 | Hoshiya et al. | 477/39 |
| 2006/0030447 A1 * | 2/2006 | Kita | 475/210 |
| 2011/0071000 A1 * | 3/2011 | Ortmann | 477/39 |

FOREIGN PATENT DOCUMENTS

| | | | |
|---|---|---|---|
| JP | 2005-114088 A | | 4/2005 |
| JP | 2005114088 A | * | 4/2005 |
| JP | 2006-038235 A | | 2/2006 |
| JP | 2006038235 A | * | 2/2006 |
| JP | 2009092210 A | * | 4/2009 |

* cited by examiner

CVT CONTROL APPARATUS

CROSS-REFERENCE TO RELATED APPLICATION

This application is a National Stage entry of International Application No. PCT/JP2010/061401, filed Jul. 5, 2010, which claims priority to Japanese Patent Application No. 2009-170838, filed Jul. 22, 2009 and Japanese Patent Application No. 2009-170839, filed Jul. 22, 2009, the disclosure of the prior applications are incorporated in their entirety by reference.

TECHNICAL FIELD

This invention relates to a CVT (Continuous Variable Transmission; automatic transmission) control apparatus.

BACKGROUND ART

In recent years, there is known torque fuse control that controls engagement pressure of a clutch arranged in series with a belt-type CVT (automatic transmission) so that the clutch is slipped before the CVT belt is slipped, thereby preventing excessive torque from being transmitted to the belt, as taught, for example, by a Patent Reference 1. In a technique of the Patent Reference 1, a lockup clutch is used as the clutch and its engagement pressure is increased and decreased with time.

PRIOR ART REFERENCE

Patent Reference

Patent Reference 1: Japanese Laid-Open Patent Application 2004-251360

SUMMARY OF INVENTION

Problems to be Solved by the Invention

In the case where a belt-type CVT is connected to an internal combustion engine (prime mover) through a forward clutch, generally a friction coefficient of the forward clutch is set to a relatively small value to prevent the forward clutch from being slipped during forward running and clutch supply hydraulic pressure is determined from output torque of the engine. In other words, since the forward clutch does not function as a fuse, the belt does not have sufficient toughness against slippage.

In that case, it is preferable to learn the friction coefficient of the clutch. However, since the friction coefficient differs depending on surface pressure of the clutch, the learning in accordance with the surface pressure is more preferable.

The object of this invention is therefore to overcome this problem by providing a control apparatus for a belt-type CVT connected to an internal combustion engine through a forward clutch, in which the forward clutch functions as a torque fuse, thereby enhancing toughness of the belt against slippage.

Means for Solving the Problems

In order to achieve the object, as recited in claim 1, this invention is configured to have an apparatus for controlling a belt type CVT connected to a prime mover mounted on a vehicle through a forward clutch to change power of the prime mover in speed and transmit the power to a driven wheel of the vehicle, comprising: operating condition determining means for determining whether it is in a predetermined operating condition where an operator is likely to apply a panic brake or the vehicle is likely running on a low friction road surface; first clutch hydraulic pressure control means for controlling supply of hydraulic pressure by setting a first value as a friction coefficient of the clutch when the vehicle is determined to be not in the predetermined operating condition and calculating a desired hydraulic pressure to be supplied to the clutch based on the set first value; and second clutch hydraulic pressure control means for controlling supply of the hydraulic pressure by setting a second value that is greater than the first value as the friction coefficient when the vehicle is determined to be in the predetermined operating condition and calculating the desired hydraulic pressure to be supplied to the clutch based on the set second value.

In the apparatus according to claim 2, the second clutch hydraulic pressure control means feedback-controls the desired hydraulic pressure to be supplied to the clutch such that a slip ratio of the clutch becomes a predetermined value.

The apparatus according to claim 3 further includes belt clamping pressure control means for controlling hydraulic pressure to be supplied to the belt as clamping pressure, and the belt clamping pressure control means supplies the clamping pressure after subtracting a value corresponding to inertia torque of the prime mover from the clamping pressure when the second value is set as the friction coefficient of the clutch.

In the apparatus according to claim 4, the second clutch hydraulic pressure control means learns the second value in association with each of zones that are divided in accordance with surface pressure of the clutch.

In the apparatus according to claim 5, the second clutch hydraulic pressure control means corrects a learning value of the friction coefficient in accordance with a temperature of operating oil of the CVT.

In the apparatus according to claim 6, the second clutch hydraulic pressure control means learns the second value through interpolation using a value in one of the divided zones where the learning is more frequently conducted.

In claim 7, it is configured to have an apparatus for controlling an automatic transmission connected to a prime mover mounted on a vehicle through a hydraulic clutch to change power of the prime mover in speed and transmit the power to a driven wheel of the vehicle, in which a friction coefficient of the clutch is learned separately for each of zones that are divided in accordance with surface pressure of the clutch.

In the apparatus according to claim 8, a learning value of the friction coefficient is corrected in accordance with a temperature of operating oil of the automatic transmission.

In the apparatus according to claim 9, the friction coefficient is learned through interpolation using a value in one of the divided zones where the learning is more frequently conducted.

Effects of the Invention

In the CVT control apparatus according to claim 1, it is configured to determine whether it is in a predetermined operating condition where an operator is likely to apply a panic brake or the vehicle is likely running on a low friction road surface, set a first value as a friction coefficient of the forward clutch to control supply of hydraulic pressure based on the set first value when the vehicle is determined to be not in the predetermined operating condition, and set a second value that is greater than the first value to control supply of the hydraulic pressure based on the set second value when the vehicle is determined to be in the predetermined operating condition. With this, even when excessive input torque is transmitted from the driven wheel upon panic braking or escaping from a low friction road surface under the predetermined operating condition, since the desired supply hydraulic pressure is calculated to decrease with increasing friction coefficient, it becomes possible to calculate the desired supply hydraulic pressure to be a lower value compared to a case where it is not in the predetermined operating condition by setting the second value of greater than the first value as the friction coefficient.

Specifically, since the torque acting on the CVT is limited to a value at or below the torque transmission capacity of the forward clutch, the toughness of the belt against slippage can be enhanced accordingly. In other words, since the forward clutch can function as a torque fuse, it becomes possible to enhance the toughness of the belt against slippage without increasing the clamping pressure of the belt.

In the apparatus according to claim 2, it is configured to set the second value and feedback-control the desired hydraulic pressure to be supplied to the forward clutch such that a slip ratio of the clutch becomes a predetermined value. With this, the forward clutch becomes to easily slip due to the control of the supply hydraulic pressure to a low value. However, since the supply hydraulic pressure is feedback-controlled so that the slip ratio becomes the predetermined value, in addition to the above effects, the forward clutch can properly function as a torque fuse.

In the apparatus according to claim 3, it is configured to have belt clamping pressure control means for controlling hydraulic pressure to be supplied to the belt as clamping pressure, and the belt clamping pressure control means supplies the clamping pressure after subtracting a value corresponding to inertia torque of the prime mover from the clamping pressure when the second value is set. With this, in addition to the above effects, the belt transmission torque corresponding to the inertia torque of the engine can be reduced and consequently, it becomes possible to further enhance the toughness of the belt against slippage.

In the apparatus according to claim 4, it is configured to learn the second value in association with each of zones that are divided in accordance with surface pressure of the clutch. With this, it becomes possible to accurately learn the friction coefficient of the forward clutch, thereby achieving the aforementioned effects more appropriately.

In the apparatus according to claim 5, it is configured to correct a learning value of the friction coefficient in accordance with a temperature of operating oil of the CVT. With this, it becomes possible to learn the friction coefficient of the forward clutch more accurately.

In the apparatus according to claim 6, it is configured to learn the second value through interpolation using a value in one of the divided zones where the learning is more frequently conducted. With this, since the second value is learned in association with the learning value in a zone where the learning is frequently conducted, similarly it becomes possible to learn the friction coefficient of the forward clutch more accurately.

In the apparatus according to claim 7, in an apparatus for controlling an automatic transmission connected to a prime mover mounted on a vehicle through a hydraulic clutch to change power of the prime mover in speed and transmit the power to a driven wheel of the vehicle, it is configured to learn a friction coefficient of the clutch separately for each of zones that are divided in accordance with surface pressure of the clutch. With this, it becomes possible to accurately learn the friction coefficient of the clutch.

In the apparatus according to claim 8, it is configured to correct a learning value of the friction coefficient in accordance with a temperature of operating oil of the automatic transmission. With this, it becomes possible to learn the friction coefficient of the clutch more accurately.

In the apparatus according to claim 9, it is configured to learn the friction coefficient through interpolation using a value in one of the divided zones where the learning is more frequently conducted. With this, since the friction coefficient is learned in association with the learning value in a zone where the learning is frequently conducted, similarly it becomes possible to learn the friction coefficient of the clutch more accurately.

DESCRIPTION OF EMBODIMENT

An embodiment for carrying out a CVT (automatic transmission) control apparatus according to the present invention will now be explained with reference to the attached drawings.

Embodiment

Figure 1:
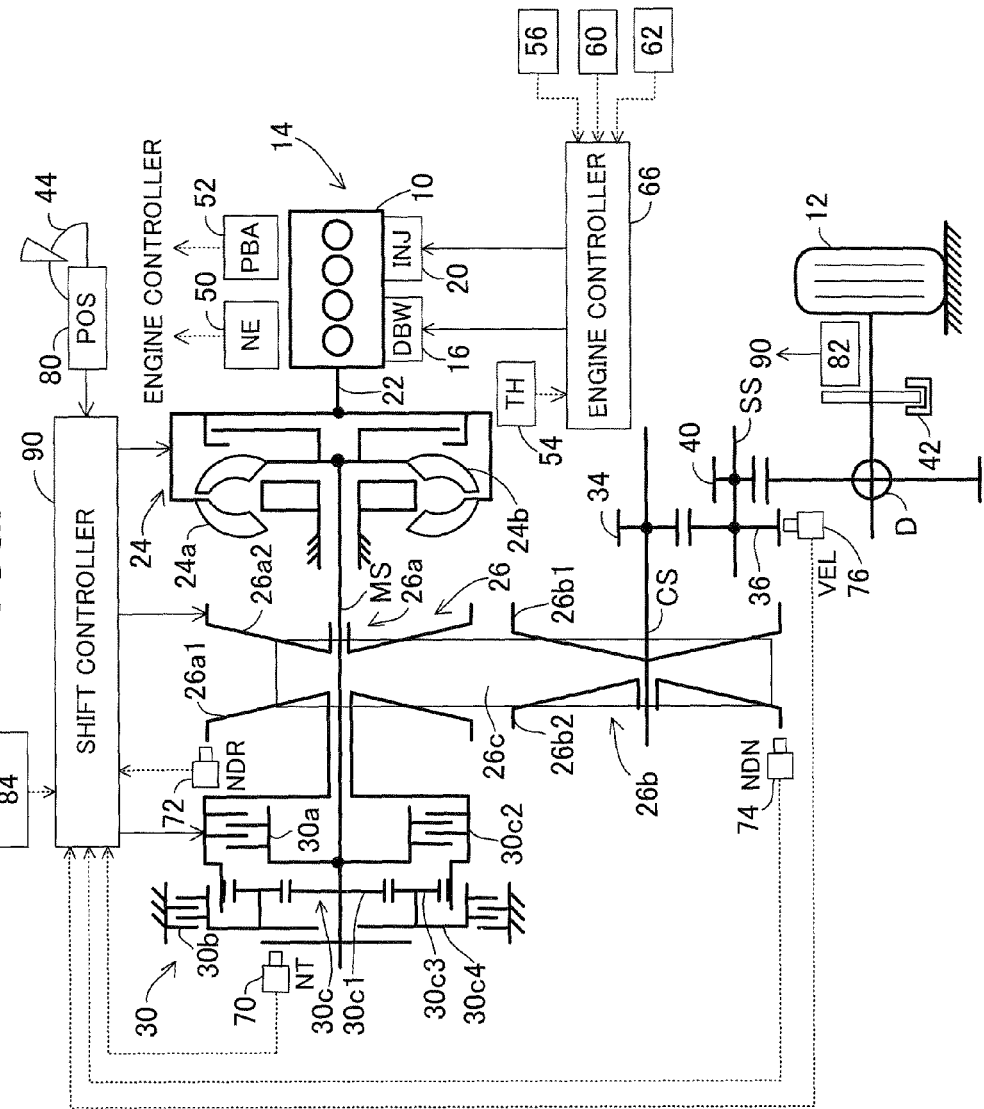
FIG. 1 is an overall view schematically showing a CVT (automatic transmission) control apparatus according to an embodiment of this invention.

FIG. 1 is an overall view schematically showing a CVT (automatic transmission) control apparatus according to an embodiment of this invention.

In FIG. 1, symbol 10 indicates an internal combustion engine (prime mover; hereinafter called the "engine"). The engine 10 is mounted on a vehicle (partially shown with its driven wheel 12, etc.) 14.

A throttle valve (not shown) installed in an air intake system of the engine 10 has no mechanical connection with an accelerator pedal (not shown) provided at the operator's seat of the vehicle but is connected to a DBW (Drive-By-Wire) mechanism 16 including an actuator such as an electric motor to be driven thereby.

Intake air regulated by the throttle valve is flown through an intake manifold (not shown) and mixed with fuel injected from an injector (fuel injection valve) 20 in the vicinity of an air intake port of each cylinder. Upon the open of an air intake valve (not shown), the resulting air-fuel mixture is flown into a combustion chamber (not shown) in the cylinder concerned. The air-fuel mixture is ignited and burned in the combustion chamber to drive a piston (not shown) to rotate the crankshaft 22 and then discharged to the exterior of the engine 10 as exhaust gas.

The rotation of the crankshaft 22 of the engine 10 is inputted to a Continuous Variable Transmission (automatic transmission; hereinafter called the "CVT") 26 through a torque converter 24. Specifically, the crankshaft 22 is connected to a pump impeller 24a of the torque converter 24, while a turbine runner 24b installed to face the pump impeller 24a and adapted to receive fluid (operating oil) is connected to a main shaft (input shaft) MS.

The CVT 26 comprises a drive pulley 26a disposed on the main shaft MS, a driven pulley 26b disposed on a countershaft (output shaft) CS installed parallel to the main shaft MS, and a belt 26c wound around the pulleys 26a, 26b.

The drive pulley 26a has a fixed pulley-half 26a1 that is installed on the main shaft MS to be not rotatable relative thereto and immovable in the longitudinal direction of the shaft MS, and a movable pulley-half 26a2 that is not rotatable relative to the shaft MS but movable in the longitudinal direction of the shaft MS relative to the fixed pulley-half 26a1.

The driven pulley 26b has a fixed pulley-half 26b1 that is installed on the countershaft CS to be not rotatable relative thereto and immovable in the longitudinal direction of the shaft CS, and a movable pulley-half 26b2 that is not rotatable relative to the countershaft CS but movable in the longitudinal direction of the shaft CS relative to the fixed pulley-half 26b1.

The CVT 26 is connected to a forward and reverse switching mechanism 30. The forward and reverse switching mechanism 30 includes a forward clutch 30a, reverse brake clutch 30b and a planetary gear mechanism 30c disposed therebetween. Thus the CVT 26 is connected to the engine 10 through the forward clutch 30a.

In the planetary gear mechanism 30c, a sun gear 30c1 is fixed to the main shaft MS and a ring gear 30c2 is fixed to the fixed pulley-half 26a1 of the drive pulley 26a through the forward clutch 30a.

A pinion 30c3 is installed between the sun gear 30c1 and ring gear 30c2. The pinion 30c3 is connected to the sun gear 30c1 through a carrier 30c4. Upon the operation of the reverse brake clutch 30b, the carrier 30c4 is fixed (locked) thereby.

The rotation of the countershaft CS is transmitted to a secondary shaft (intermediate shaft) SS through reduction gears 34, 36 and the rotation of the secondary shaft SS is transmitted to the right and left driven wheels 12 (only right side shown) through a gear 40 and differential D. A disk brake 42 is installed near each of the driven wheels 12 (and free wheels (not shown); hereinafter the driven wheels 12 and free wheels are collectively called the "wheels").

The switching operation between the forward clutch 30a and reverse brake clutch 30b is conducted upon the operator's manipulation of a shift lever 44 provided at the operator's seat of the vehicle and having positions of, for example, P, R, N, D, S and L. Specifically, when the operator manipulates the lever 44 to select one of the positions, the selection is transmitted to a manual valve of a hydraulic mechanism (explained later) of the CVT 26, etc.

For instance, when one of the D, S and L positions is selected, a spool of the manual valve is displaced in response thereto to discharge the operating oil (hydraulic pressure) from a piston chamber of the reverse brake clutch 30b, while supplying the hydraulic pressure to a piston chamber of the forward clutch 30a so that the forward clutch 30a is engaged.

Upon the engagement of the forward clutch 30a, all the gears are rotated integrally with the main shaft MS and the drive pulley 26a is driven to be rotated in the same direction as the main shaft MS (forward running direction).

On the other hand, when the R position is selected, the operating oil is discharged from the piston chamber of the forward clutch 30a, while being supplied to the piston chamber of the reverse brake clutch 30b so that the reverse brake clutch 30b is operated. Consequently, the carrier 30c4 is fixed so that the ring gear 30c2 is driven in the opposite direction from the sun gear 30c1, and the drive pulley 26a is driven in the opposite direction from the main shaft MS (reverse running direction).

When the P or N position is selected, the operating oil is discharged from both of the piston chambers to disengage both the forward clutch 30a and reverse brake clutch 30b so that the power transmission through the forward and reverse switching mechanism 30 is cut off, whereby the power transmission between the engine 10 and the drive pulley 26a of the CVT 26 is blocked.

Figure 2:
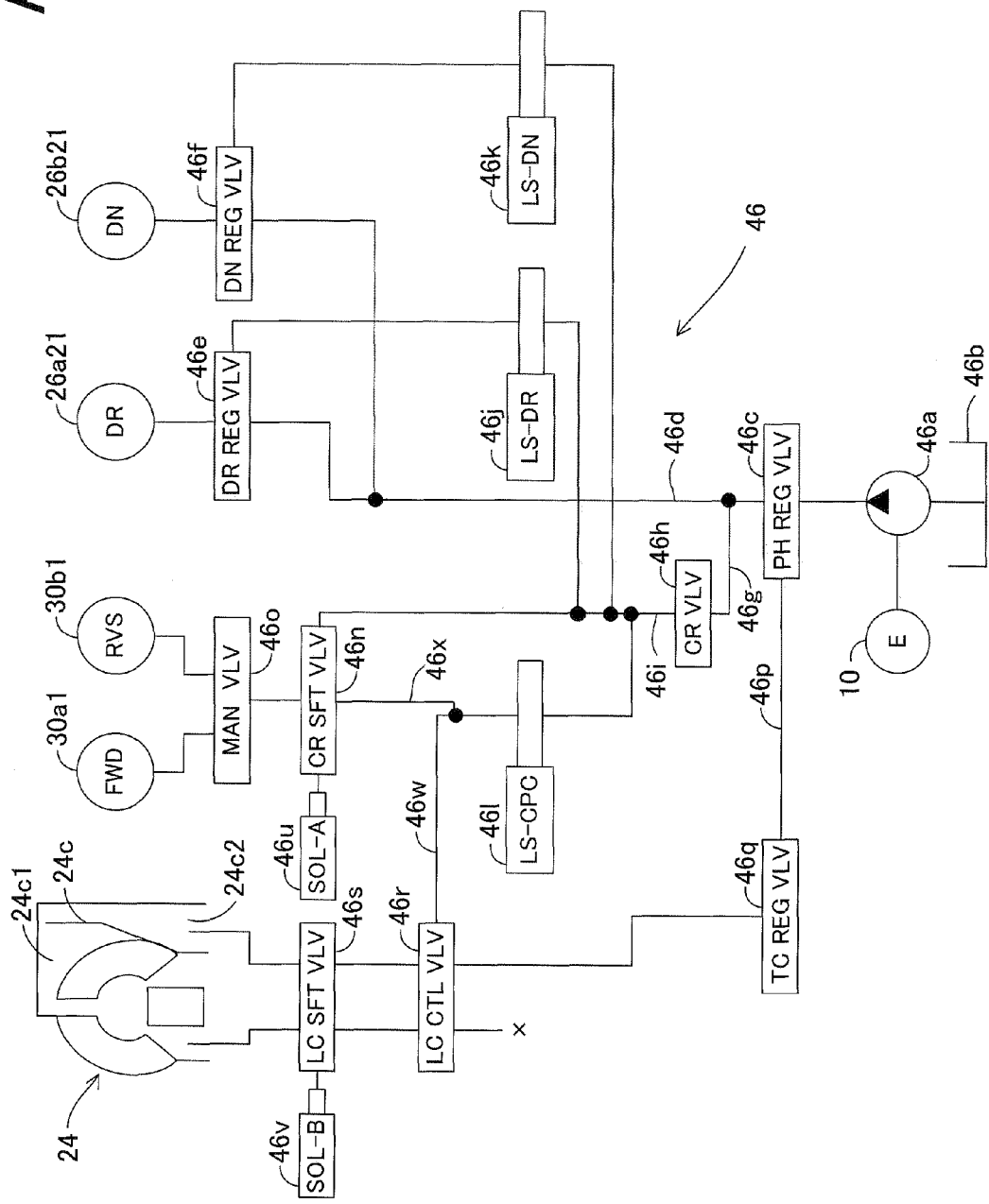
FIG. 2 is a hydraulic circuit diagram of a CVT (automatic transmission), etc., shown in FIG. 1.

FIG. 2 is a hydraulic circuit diagram showing the hydraulic circuit of the CVT 26, etc.

As illustrated, a hydraulic pump 46a is provided in the hydraulic circuit (now assigned by symbol 46). The hydraulic pump 46a comprising a gear pump is driven by the engine 10 to pump up the operating oil stored in a reservoir 46b and forward the pressurized oil to a PH regulator valve (PH REG VLV) 46c.

An output (PH pressure (line pressure)) of the PH regulator valve 46c is connected via an oil passage 46d and first and second regulator valves (DR REG VLV, DN REG VLV) 46e, 46f to a piston chamber (DR) 26a21 of the movable pulley-half 26a2 of the drive pulley 26a of the CVT 26 and to a piston chamber (DN) 26b21 of the movable pulley-half 26b2 of the driven pulley 26b thereof, while being connected to a CR valve (CR VLV) 46h through an oil passage 46g.

The CR valve 46h decreases the PH pressure to generate CR pressure (control pressure) to be supplied to first, second and third (electromagnetic) linear solenoid valves 46j, 46k, 46l (LS-DR, LS-DN, LS-CPC) through an oil passage 46i. The first and second linear solenoid valves 46j, 46k apply the output pressures, which are determined in response to magnetization of their solenoids, to the first and second regulator valves 46e, 46f to supply the operating oil of the PH pressure supplied through the oil passage 46d to the piston chambers 26a21, 26b21 of the movable pulley-halves 26a2, 26b2, thereby generating the pulley clamping pressure in response thereto.

Therefore, in the configuration shown in FIG. 1, the pulley clamping pressure for moving the movable pulley-halves 26a2, 26b2 in the shaft longitudinal direction is generated to change the pulley widths of the drive pulley 26a and driven pulley 26b so as to vary winding radiuses of the belt 26c. Thus, a gear ratio at which an output of the engine 10 is transmitted to the driven wheels 12 can be continuously or steplessly changed by regulating the pulley clamping pressure.

Returning to the explanation of FIG. 2, an output (CR pressure) of the CR valve 46h is also connected to a CR shift valve (CR SFT VLV) 46n and then connected via the aforementioned manual valve (MAN VLV; now assigned by symbol 46*o*) to the piston chamber (FWD) 30*a*1 of the forward clutch 30*a* of the forward and reverse switching mechanism 30 and the piston chamber (RVS) 30*b*1 of the reverse brake clutch 30*b* thereof.

As explained above with reference to FIG. 1, the manual valve 46*o* connects an output of the CR shift valve 46*n* with either one of the piston chambers 30*a*1, 30*b*1 of the forward clutch 30*a* and reverse brake clutch 30*b* in accordance with a position of the shift lever 44 manipulated (selected) by the operator.

The output of the PH regulator valve 46*c* is sent to a TC regulator valve (TC REG VLV) 46*q* through an oil passage 46*p* and an output of the TC regulator valve 46*q* is connected to an LC shift valve (LC SFT VLV) 46*s* through an LC control valve (LC CTL VLV) 46*r*. An output of the LC shift valve 46*s* is connected to a piston chamber 24*c*1 of the lockup clutch 24*c* of the torque converter 24 and also to a chamber 24*c*2 disposed on the back side of the piston chamber 24*c*1.

The CR shift valve 46*n* and LC shift valve 46*s* are connected to first and second (electromagnetic) ON/OFF solenoids (SOL-A, SOL-B) 46*u*, 46*v*, respectively. Upon the magnetization and demagnetization of the solenoids 46*u*, 46*v*, the operation of switching the oil passage to the forward clutch 30*a* and the operation of engaging (ON) and disengaging (OFF) the lockup clutch 24*c* are controlled.

In the lockup clutch 24*c*, when the operating oil is supplied to the piston chamber 24*c*1 and discharged from the back chamber 24*c*2 through the LC shift valve 46*s*, the lockup clutch 24*c* is engaged (fastened; made ON). In contrast, when the operating oil is supplied to the back chamber 24*c*2 and discharged from the piston chamber 24*c*1, the lockup clutch 24*c* is disengaged (unfastened; made OFF). A slip amount of the lockup clutch 24*c*, i.e., the capacity of engagement thereof when it is slipped between the engaged and disengaged conditions, is determined based on an amount of the operating oil (hydraulic pressure) supplied to the piston chamber 24*c*1 and back chamber 24*c*2.

The third linear solenoid valve 46*l* is connected to the LC shift valve 46*s* through an oil passage 46*w* and the LC control valve 46*r*, and further to the CR shift valve 46*n* through an oil passage 46*x*. Specifically, the forward clutch 30*a* and the capacity of engagement (slip amount) of the lockup clutch 24*c* are regulated (controlled) in response to the magnetization and demagnetization of the third linear solenoid valve 46*l*.

The explanation on FIG. 1 will be resumed. A crank angle sensor 50 is installed at an appropriate position, e.g., near the camshaft (not shown) of the engine 10, and produces an output or signal indicative of an engine speed NE at every predetermined crank angle position of the piston. A manifold absolute pressure sensor 52 is installed at an appropriate position downstream of the throttle valve in the intake system and produces an output or signal proportional to manifold absolute pressure (engine load) PBA.

A throttle opening sensor 54 installed at the actuator of the DBW mechanism 16 produces an output or signal proportional to a throttle opening TH based on a rotational amount of the actuator, and an accelerator position sensor 56 installed near the accelerator pedal produces an output or signal proportional to an accelerator position or opening AP corresponding to an amount of operator's manipulation of the accelerator pedal.

Further, a coolant temperature sensor 60 installed near a coolant passage (not shown) of the engine 10 produces an output or signal indicative of an engine coolant temperature TW, i.e., a temperature of the engine 10, and an intake air temperature sensor 62 installed in the intake system produces an output or signal indicative of a temperature (ambient temperature) of the intake air to be sucked in the engine 10.

The outputs of the crank angle sensor 50 and other sensors are sent to an engine controller 66. The engine controller 66 includes a microcomputer and based on the sensor outputs, determines a desired throttle opening to control the operation of the DBW mechanism 16 and determines a fuel injection amount to operate the injector 20.

An NT sensor (rotational speed sensor) 70 is installed at the main shaft MS and produces a pulse signal indicative of a rotational speed of the turbine runner 24*b*, specifically a rotational speed of the main shaft MS, more specifically an input shaft rotational speed of the forward clutch 30*a*.

An NDR sensor (rotational speed sensor) 72 is installed at an appropriate position near the drive pulley 26*a* of the CVT 26 and produces a pulse signal indicative of a rotational speed of the drive pulley 26*a*, specifically an output shaft rotational speed of the forward clutch 30*a*. An NDN sensor (rotational speed sensor) 74 is installed at an appropriate position near the driven pulley 26*b* and produces a pulse signal indicative of a rotational speed of the driven pulley 26*b*.

A VEL sensor (rotational speed sensor) 76 is installed near the gear 36 of the secondary shaft SS and produces a pulse signal indicating an output shaft rotational speed of the CVT 26 or a vehicle speed VEL through a rotational speed of the gear 36. A shift lever position sensor installed near the shift lever 44 produces a POS signal corresponding to a position such as R, N, D or the like selected by the operator.

A wheel speed sensor 82 is installed at an appropriate position of each of the four wheels including the driven wheels 12 and free wheels and produces an output or signal indicative of a rotational speed of the associated wheel, which is proportional to the wheel speed. A temperature sensor 84 (not shown in FIG. 2) is installed at an appropriate position of the hydraulic circuit 46 and produces an output or signal indicative of an oil temperature (temperature of the operating oil ATF) TATF.

The outputs of the abovementioned NT sensor 70, etc., and outputs of other unshown sensors are sent to a shift controller 90. The shift controller also includes a microcomputer and is configured to be communicatable with the engine controller 66.

Based on the detected values, the shift controller 90 magnetizes and demagnetizes the electromagnetic solenoids such as the first and second ON/OFF solenoids 46*u*, 46*v* of the hydraulic circuit 46 to control the operations of the forward and reverse switching mechanism 30, CVT 26 and torque converter 24.

Further, based on the detected values, the shift controller 90 determines whether it is in a predetermined operating condition and based on the determination result, performs clutch capacity control for controlling the hydraulic pressure to be supplied to the forward clutch 30*a* and clamping pressure control of the belt 26*c*.

Figure 3:
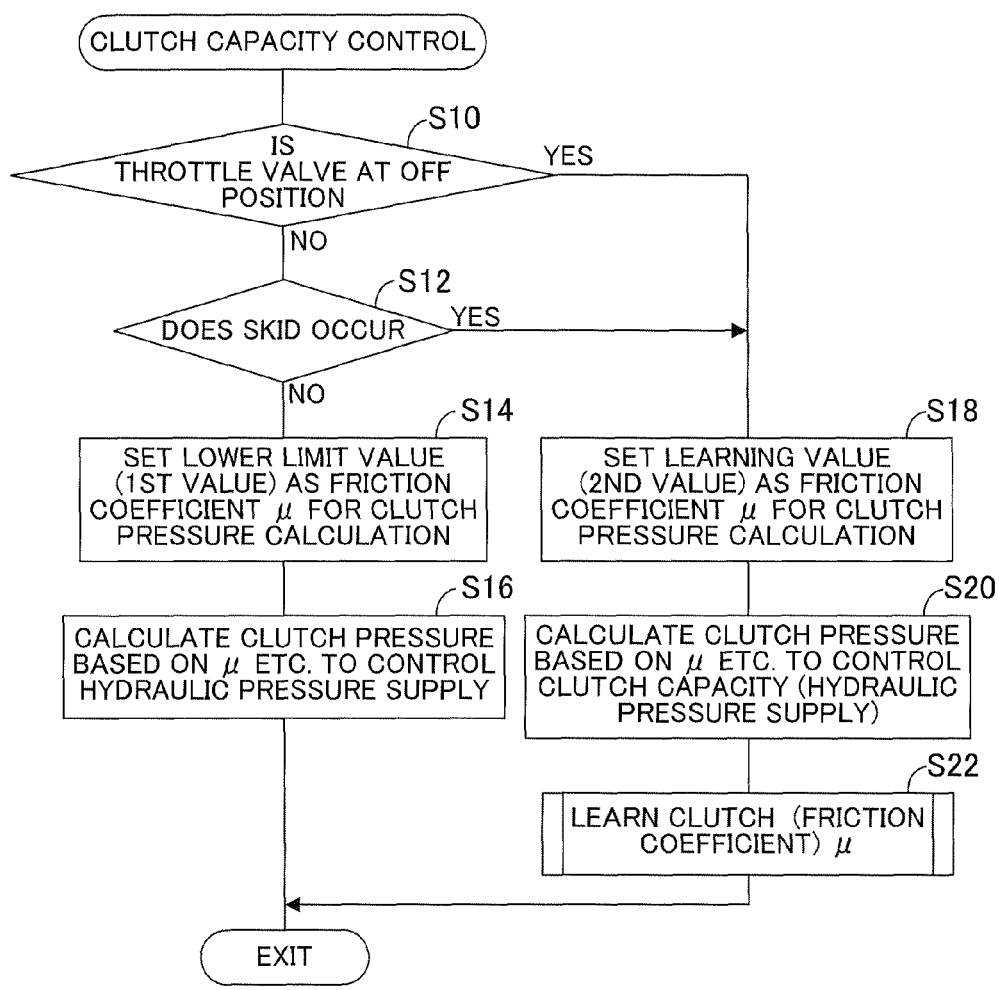
FIG. 3 is a flowchart showing clutch capacity control among operations of the apparatus shown in FIG. 1.

FIG. 3 is a flowchart showing the operation in the clutch capacity control of the shift controller 90. The illustrated program is executed by the shift controller 90 at predetermined intervals, e.g., 10 milliseconds.

The program begins at S10, in which it is determined based on the output of the throttle opening sensor 54 whether the throttle valve is at an OFF position, i.e., at a fully-closed position (more precisely, at a substantially fully-closed position), in other words, whether it is in a predetermined operating condition where the operator is likely to apply a panic brake. Note that, when the disk brake 42 is operated by the operator with pressing force greater than a prescribed value, the driven wheel 12 is locked and it is called the "panic brake."

When the result in S10 is negative, the program proceeds to S12, in which it is determined whether a skid occurs, i.e., the wheels are slipped, in other words, whether it is in a predetermined operating condition where the vehicle is likely running on a low friction road surface. This determination is made by checking as to whether one of slip ratios of the wheels aligned in the vehicle's longitudinal direction and that of the wheels aligned in the vehicle's lateral direction is out of a predetermined range based on the outputs of the four wheel speed sensors 82.

When the result in S12 is negative, it is discriminated to be not in the predetermined operating condition where the operator is likely to apply a panic brake or the vehicle is likely running on a low friction road surface, and the program proceeds to S14, in which a friction coefficient μ for clutch pressure calculation (a friction coefficient used for calculating clutch pressure of the forward clutch 30a) is set with a lower limit value of a learning value which will be explained later, i.e., a small value such as 0.08 for example (first value).

Next the program proceeds to S16, in which the clutch pressure (desired hydraulic pressure to be supplied to the forward clutch 30a) is calculated based on the set friction coefficient μ for clutch pressure calculation, etc., so that the forward clutch 30a is not slipped and based on the calculated clutch pressure, the hydraulic pressure supply is controlled. Specifically, the clutch pressure is calculated through an equation below.

Clutch pressure=Clutch input torque (corresponding to the engine torque)/(Friction coefficient μ×Piston area×Number of surfaces (plates) of clutch× Clutch effective diameter). The value of "Piston area×Number of surfaces of clutch×Clutch effective diameter" is a fixed value.

On the other hand, when the result in S10 is affirmative, i.e., when it is discriminated to be in the predetermined operating condition where the operator is likely to apply the panic brake, the program proceeds to S18. Also when the result in S12 is affirmative, i.e., when it is discriminated to be in the predetermined operating condition where the vehicle is likely running on a low friction road surface, the program similarly proceeds to S18.

In S18, the friction coefficient μ for clutch pressure calculation is set with a latest learning value (explained later), e.g., 0.20 (second value).

Next the program proceeds to S20, in which the clutch pressure is similarly calculated based on the set friction coefficient μ for clutch pressure calculation, etc., and based on the calculated clutch pressure, the hydraulic pressure supply is controlled. As is clear from the above equation, the clutch pressure is calculated to decrease with increasing friction coefficient μ. Consequently, when it is in the predetermined operating condition, the value μ, is set with the second value that is greater than the first value so as to make the clutch pressure lower compared to that of when it is not in the predetermined operating condition.

However, when the clutch pressure is controlled to be low, it makes the forward clutch 30a easily slip. In order to prevent this, to suppress a heat generation amount during clutch slippage and to accurately learn the friction coefficient μ of the forward clutch 30a, the clutch pressure is feedback-controlled so that the slip ratio of the forward clutch 30a becomes a predetermined value, e.g., 1 percent.

The slip ratio of the forward clutch 30a is calculated using a ratio of rotational speeds detected by the NT sensor 70 and NDR sensor 72.

Next the program proceeds to S22, in which the clutch μ, i.e., the abovementioned friction coefficient μ for clutch pressure calculation is learned.

Figure 4:
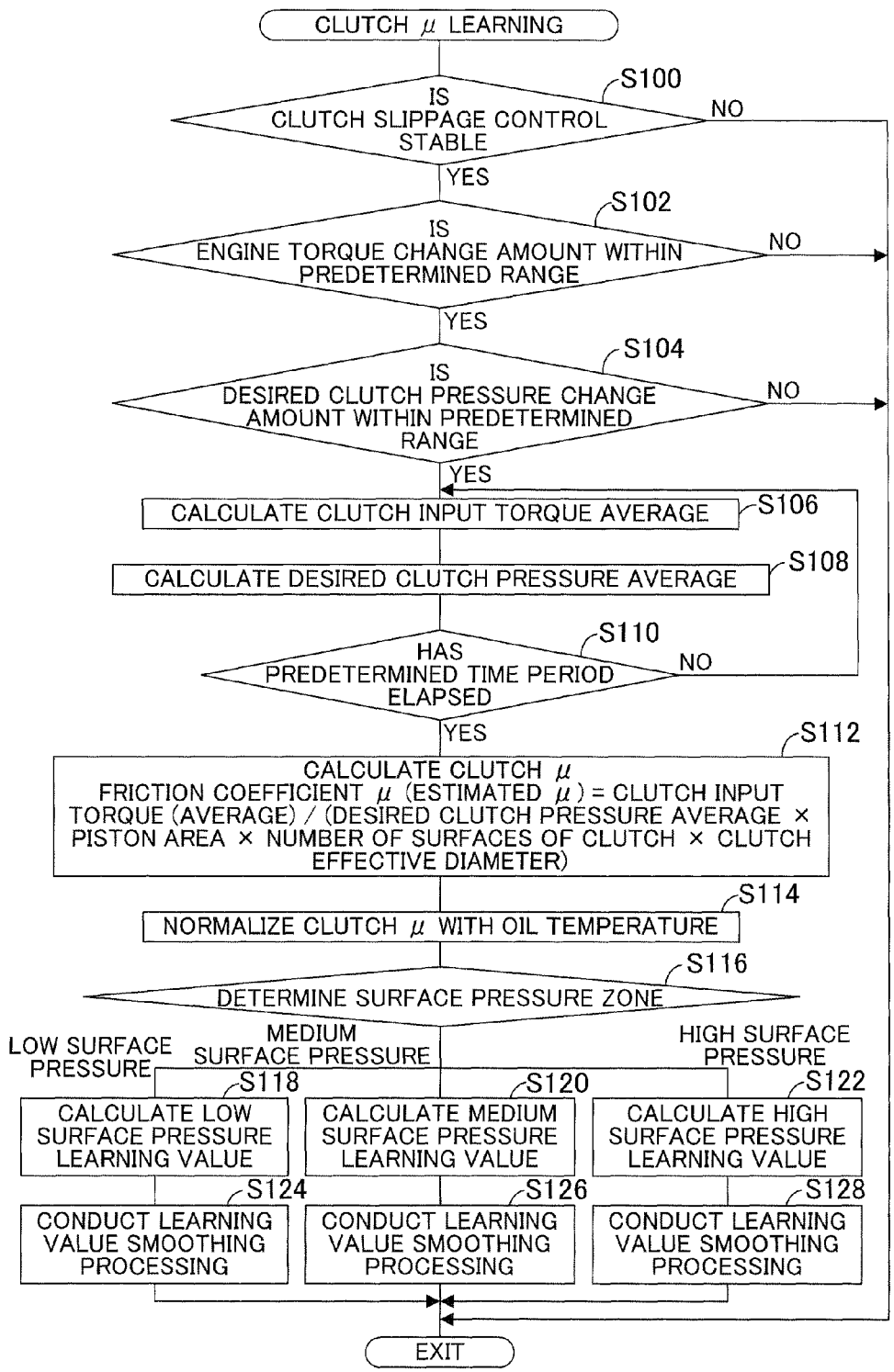
FIG. 4 is a subroutine flowchart showing a process of learning a clutch μ calculation value (a friction coefficient μ of a forward clutch) in the FIG. 3 flowchart.

FIG. 4 is a subroutine flowchart showing the learning process.

In S100, it is determined whether the feedback control implemented in S20 is stable. This determination is made by checking as to whether the slip ratio of the forward clutch 30a remains at 1 percent continuously for a predetermined time period, e.g., 1 second.

When the result in S100 is negative, the remaining steps are skipped and when the result is affirmative, the program proceeds to S102, in which it is determined whether a change amount of the engine torque is within a predetermined range, e.g., a range of 10 percent.

The engine torque is calculated by retrieving mapped values prepared beforehand using the engine speed NE and manifold absolute pressure PBA and the determination in S102 is made by checking as to whether a difference between results of the calculations in the present and previous program loops is within the predetermined range.

When the result in S102 is negative, the remaining steps are skipped and when the result is affirmative, the program proceeds to S104, in which it is determined whether a change amount of desired clutch pressure is within a predetermined range, e.g., a range of 10 percent. The desired clutch pressure means the same as the clutch pressure calculated in S20 (or S16) and the determination in S104 is made by checking as to whether a difference between results of the calculations in the present and previous program loops is within the predetermined range.

When the result in S104 is negative, the remaining steps are skipped and when the result is affirmative, the program proceeds to S106, in which a clutch input torque average, i.e., an average of torque inputted to the forward clutch 30a for a predetermined time period, e.g., 1 second, is calculated.

It should be noted that, although the engine torque calculated in S102 is substituted for the clutch input torque, the operating condition of the torque converter 24, etc., can be additionally used.

Next the program proceeds to S108, in which an average of the desired clutch pressure calculated in S104 for a predetermined time period (e.g., 1 second) is calculated and to S110, in which it is determined whether the predetermined time period has elapsed. Whenever the result in S110 is negative, the program returns to S106.

When the result in S110 is affirmative, the program proceeds to S112, in which the clutch μ a is calculated, i.e., the friction coefficient μ for clutch pressure calculation (estimated μ) is calculated through the illustrated equation. In the equation, the clutch input torque (average) and desired clutch pressure (average) are the values calculated in S106 and S108. Similarly to the calculation of the clutch pressure, the piston area of the forward clutch 30a, etc., are fixed values.

Figure 5:
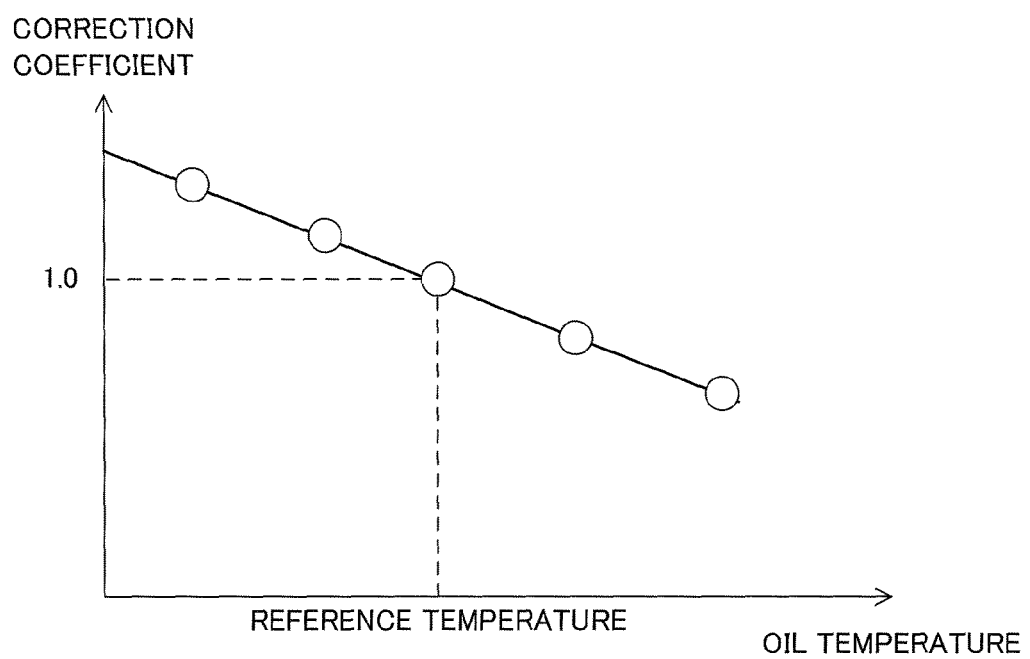
FIG. 5 is an explanatory view showing the characteristics of a correction coefficient used for normalizing (correcting) the clutch μ calculation value calculated in the FIG. 4 flowchart.

Next the program proceeds to S114, in which the obtained friction coefficient μ for clutch pressure calculation (estimated μ) is normalized with the oil temperature TATF. To be specific, since viscosity of the operating oil ATF decreases with increasing temperature thereof, a correction coefficient is calculated by retrieving the characteristics of the correction coefficient shown in FIG. 5, in which a value corresponding to a reference temperature (e.g., 40 degrees) is set as 1.0, using the output of the temperature sensor 84 and the calculated friction coefficient μ is multiplied by the correction coefficient, i.e., it is corrected with the temperature. The characteristics shown in FIG. 5 are stored in a memory of the shift controller 90.

Next the program proceeds to S116, in which a surface pressure zone is determined.

Figure 6:
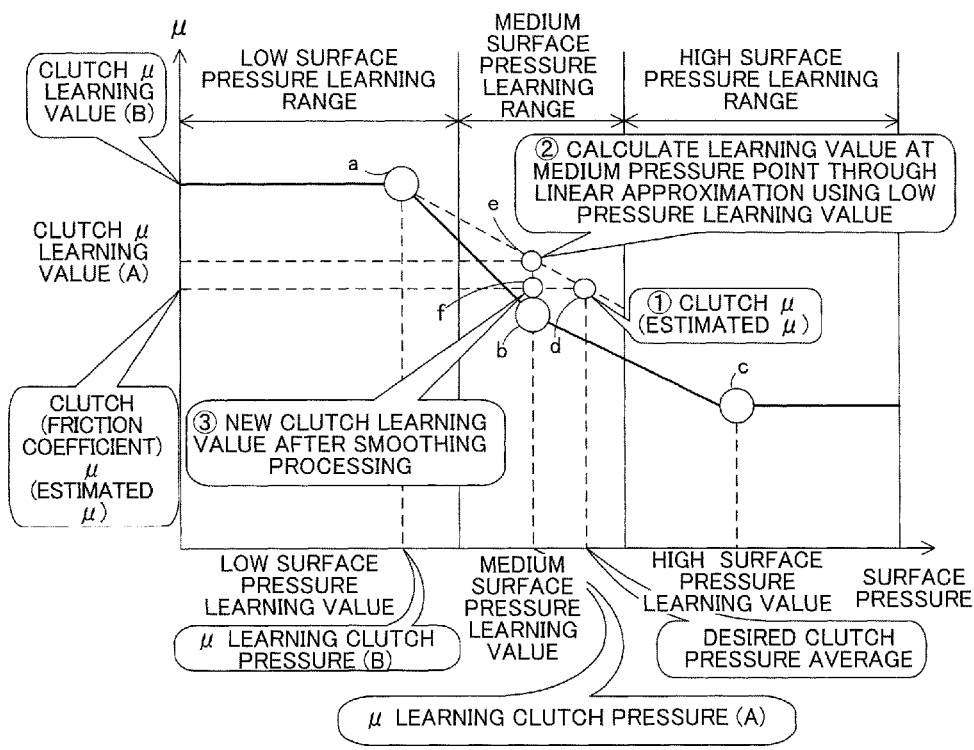
FIG. 6 is an explanatory view for explaining surface pressure zones and learning of associated zones in the FIG. 4 flowchart.

FIG. 6 is an explanatory view showing the characteristics of the surface pressure zones stored in the memory of the shift controller 90. As illustrated, the surface pressure zones include a low surface pressure learning range (zone), medium surface pressure learning range (zone) and high surface pressure learning range (zone).

Although the surface pressure means pressure per unit area of the surface (plate) of the forward clutch 30a, the clutch pressure (desired clutch pressure) calculated in S20 of the FIG. 3 flowchart is substituted here.

In S116, a concerned one of the surface pressure zones is determined by retrieving the characteristics shown in FIG. 6 using calculated supply hydraulic pressure and based on the determination result, the program proceeds to one of steps S118 to S122 to calculate a μ learning value and subsequently, proceeds to one of steps S124 to S128 to calculate a weighted average in the learning values of the present and previous program loops, i.e., conduct smoothing processing.

As shown in FIG. 6, the clutch μ (friction coefficient μ) has a property of decreasing with increasing surface pressure. An equation for calculating the learning value through interpolation is shown at the middle of FIG. 6. The learning value is calculated in accordance with the equation in one of the steps S118 to S122.

The explanation will be simply made with reference to FIG. 6. Defining latest learning values in the low, medium and high surface pressure zones as a, b, c and the calculated clutch μ (estimated μ) obtained in S112 in the present program loop as d, the μ learning value (A) in the present program loop is calculated in accordance with the illustrated equation.

As is clear from the equation and a table thereunder in FIG. 6, the μ learning value (A) should be calculated by linear-interpolating between the surface pressure zone which contains the clutch μ obtained in the present program loop and another (i.e., lower) zone next thereto.

Specifically, the clutch μ d obtained in the present program loop is linear-interpolated between the latest learning values a and b associated with two zones to calculate the μ learning value (A) as a value e on the same line (surface pressure) as the value b associated with the same zone as the clutch μ d.

Since a sudden change in the learning value is not preferable, the smoothing processing is conducted in every program loop so that the μ learning value (A) gradually approaches from a value g to the value e.

As mentioned above, the learning value is calculated between one surface pressure zone in which the clutch μ is calculated in the present program loop and another lower surface pressure zone. This is because, since the learning operation is conducted with the throttle valve at the OFF position on the lower surface pressure side in the case of the FIG. 3 flowchart, the learning is conducted more frequently compared to the high surface pressure side, i.e., compared to the time when it is determined that a skid occurs, and consequently, the accuracy of calculation of the learning value is high.

Figure 7:
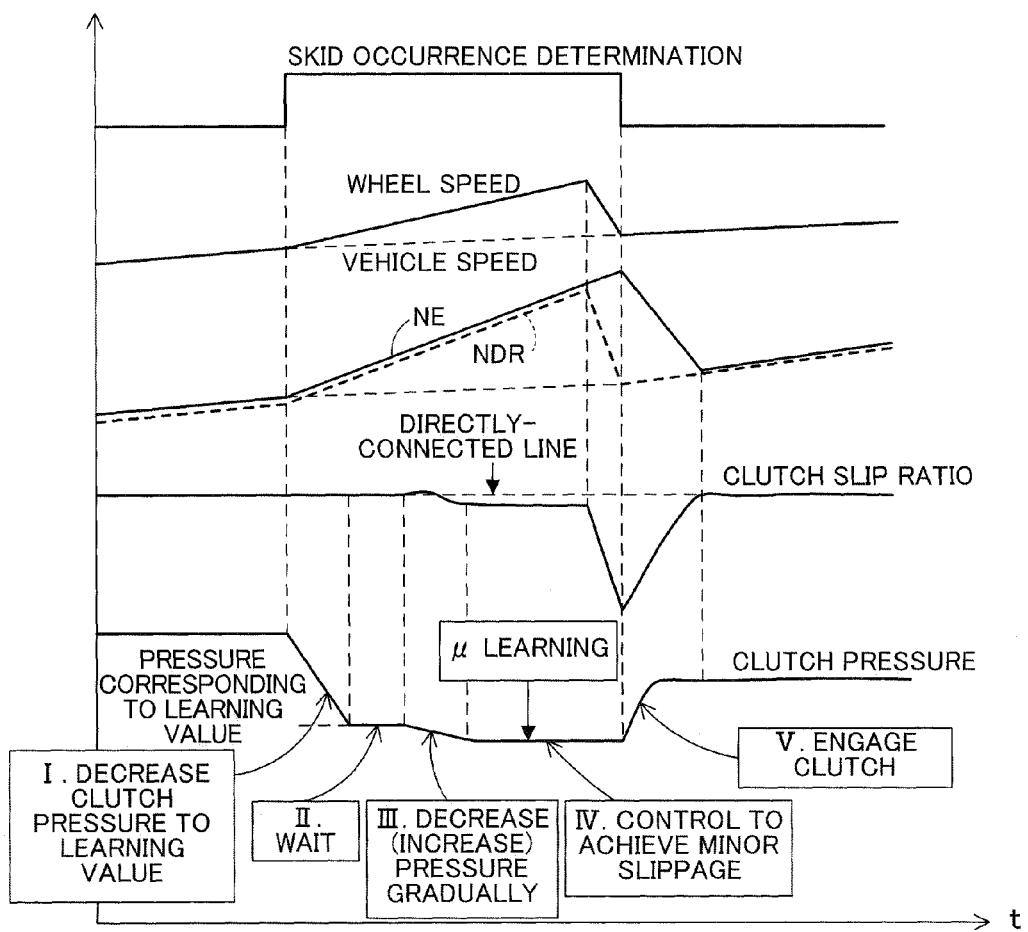
FIG. 7 is a time chart for explaining processes of S20 and S22 in the FIG. 3 flowchart.

FIG. 7 is a time chart for explaining the processes of S20 and S22 in the FIG. 3 flowchart.

First, the process is started upon the determination of skid occurrence, the clutch pressure is decreased to a value corresponding to the learning value (I), and a hydraulic pressure response is waited (II). When the clutch is slipped, the clutch pressure is gradually increased, while when it is not slipped, the clutch pressure is gradually decreased (III), so that the clutch pressure is controlled to achieve the slip ratio of 1 percent (more precisely, at or below 1 percent) (this pressure increase and decrease control is implemented before the feedback control in S20) (IV). Then the clutch pressure is increased to engage the forward clutch 30a so as not to slip (V).

Next, the clamping pressure control of the belt 26c conducted by the shift controller 90 will be explained.

Figure 8:
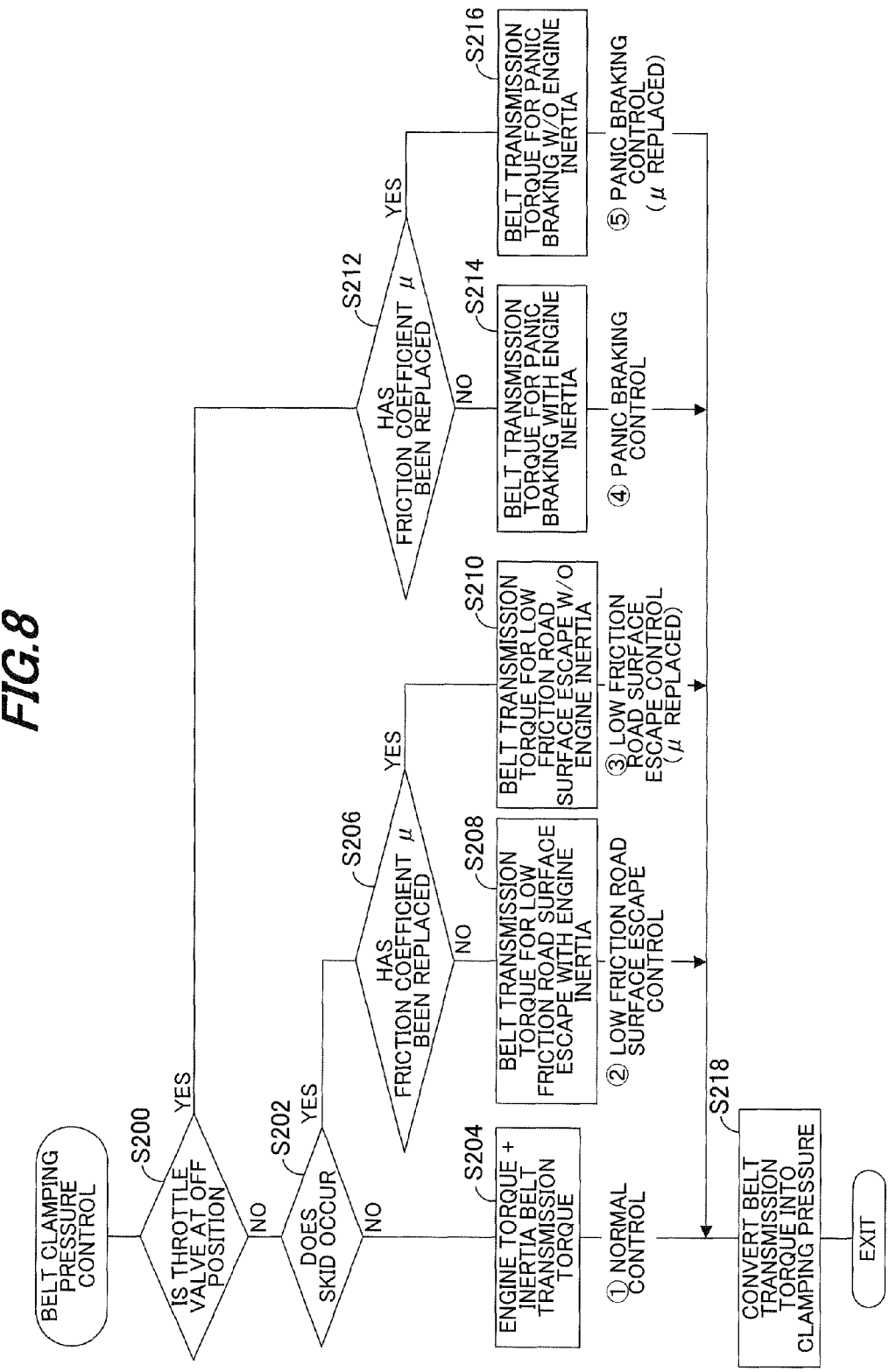
FIG. 8 is a flowchart showing a belt clamping pressure control among the operations of the apparatus shown in FIG. 1.

FIG. 8 is a flowchart showing the operation. The illustrated program is also conducted by the shift controller 90 at predetermined intervals, e.g., 10 milliseconds.

The program begins at S200, in which it is determined based on the output of the throttle opening sensor 54 whether the throttle valve is at the OFF position, i.e., whether it is in the predetermined operating condition where the operator is likely to apply the panic brake. When the result in S200 is negative, the program proceeds to S202, in which it is determined whether a skid occurs, i.e., whether it is in the predetermined operating condition where the vehicle is likely running on a low friction road surface.

When the result in S202 is negative, it is discriminated to be not in the predetermined operating condition where the operator is likely to apply the panic brake or the vehicle is likely running on a low friction road surface and the program proceeds to S204, in which normal control is implemented, i.e., a sum of the engine torque and inertia torque is applied as belt transmission torque.

On the other hand, when the result in S202 is affirmative, i.e., when it is discriminated to be in the predetermined operating condition where the vehicle is likely running on a low friction road surface, the program proceeds to S206, in which it is determined whether the friction coefficient μ for clutch pressure calculation has been replaced, i.e., whether the first value set as the friction coefficient μ has been replaced by the second value in the FIG. 3 flowchart and a predetermined transition time period has elapsed after that. When the result in S206 is negative, the program proceeds to S208, in which belt transmission torque for low friction road surface escape including engine inertia is applied, while when the result is affirmative, the program proceeds to S210, in which belt transmission torque for low friction road surface escape without engine inertia is applied.

On the other hand, when the result in S200 is affirmative, i.e., when it is discriminated to be in the predetermined operating condition where the operator is likely to apply the panic brake, the program proceeds to S212, in which it is determined whether the friction coefficient μ a has been replaced. When the result in S212 is negative, the program proceeds to S214, in which belt transmission torque for panic braking including engine inertia is applied, while when the result is affirmative, the program proceeds to S216, in which belt transmission torque for panic braking without engine inertia is applied.

Figure 9:
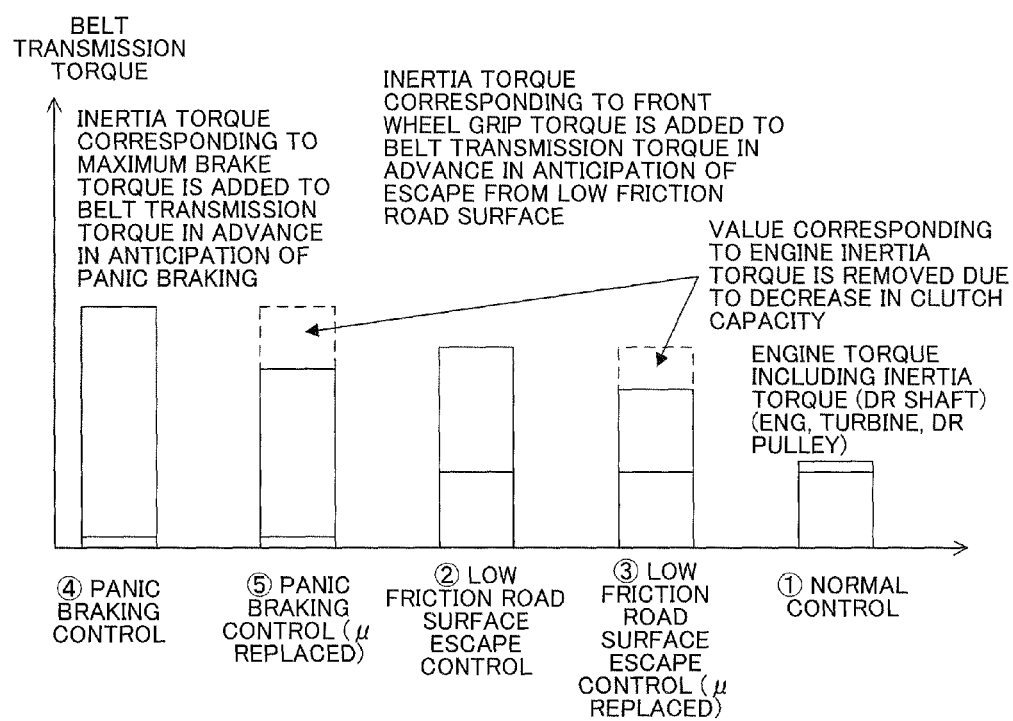
FIG. 9 is an explanatory view showing belt transmission torque calculated in a process of the FIG. 8 flowchart.

FIG. 9 shows the above belt transmission torque.

Explaining a case of the normal control (1 in a circle) in S204, a value obtained by adding the inertia torque on the main shaft MS (inertia torque of the engine 10, turbine runner 24b and drive pulley 26a) to the engine torque (retrieved using the engine speed NE and manifold absolute pressure PBA) is set as the belt transmission torque.

As for low friction road surface escape control (2 and 3 in circles), a value obtained by adding the inertia torque corresponding to front wheel grip torque to the engine torque, which value is prepared in advance in anticipation of escape from a low friction road surface, is set as the belt transmission torque.

As panic braking control (4 and 5 in circles), a value obtained by adding the inertia torque corresponding to the maximum brake torque to the engine torque, which value is prepared in advance in anticipation of panic braking, is set as the belt transmission torque.

Equations for calculating the inertia torque for panic braking are shown at the bottom of FIG. 9. In the equations, Ie is the engine inertia, Itbn the turbine inertia, Idr the drive pulley inertia, and Idn the driven pulley inertia.

When the friction coefficient μ has been replaced, a torque transmission capacity of the forward clutch 30a is decreased. Therefore, a value corresponding to the engine inertia torque (more exactly, the inertia torque of the engine 10 and turbine runner 24b) is removed.

Figure 10:
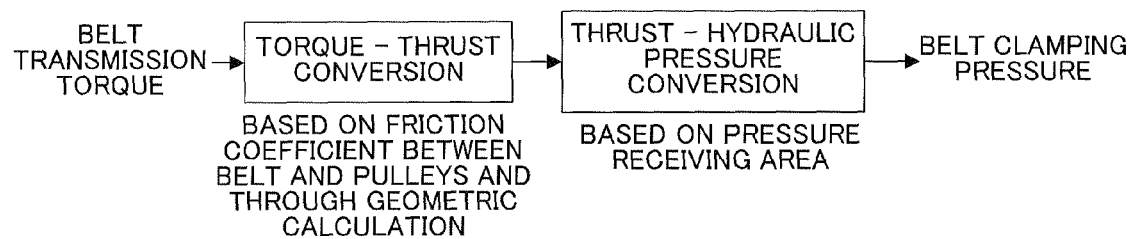
FIG. 10 is a block diagram showing conversion of the belt transmission torque to clamping pressure in the FIG. 8 flowchart.

Next the program proceeds to S218, in which the calculated belt transmission torque is converted to the clamping pressure, i.e., to the belt clamping pressure as shown in FIG. 10. Based on this, the clamping pressure of the CVT 26 is controlled through an unshown routine.

As stated above, this embodiment is configured to have an apparatus (shift controller 90) for controlling a belt type CVT 26 connected to an engine (prime mover) 10 mounted on a vehicle 14 through a forward clutch 30a to change power of the engine (prime mover) in speed and transmit the power to a driven wheel 12 of the vehicle 14, comprising: operating condition determining means (S10, S12) for determining whether it is in a predetermined operating condition where an operator is likely to apply a panic brake or the vehicle 14 is likely running on a low friction road surface; first clutch hydraulic pressure control means (S14, S16) for controlling supply of hydraulic pressure by setting a first value as a friction coefficient μ of the clutch when the vehicle 14 is determined to be not in the predetermined operating condition and calculating a desired hydraulic pressure to be supplied to the clutch based on the set first value; and second clutch hydraulic pressure control means (S18 to S22) for controlling supply of the hydraulic pressure by setting a second value that is greater than the first value as the friction coefficient when the vehicle is determined to be in the predetermined operating condition and calculating the desired hydraulic pressure to be supplied to the clutch based on the set second value. With this, even when excessive input torque is transmitted from the driven wheel 12 upon panic braking or escaping from a low friction road surface under the predetermined operating condition, since the desired supply hydraulic pressure is calculated to decrease with increasing friction coefficient, it becomes possible to calculate the desired supply hydraulic pressure to be a lower value compared to a case where it is not in the predetermined operating condition by setting the second value of greater than the first value as the friction coefficient.

Specifically, since the torque acting on the CVT 26 is limited to a value at or below the torque transmission capacity of the forward clutch 30a, the toughness of the belt 26c against slippage can be enhanced accordingly. In other words, since the forward clutch 30a can function as a torque fuse, it becomes possible to enhance the toughness of the belt 26c against slippage without increasing the clamping pressure of the belt 26c.

In the apparatus, the second clutch hydraulic pressure control means feedback-controls the desired hydraulic pressure to be supplied to the clutch 30a such that a slip ratio of the clutch 30a becomes a predetermined value (S20). With this, the forward clutch 30a becomes to easily slip due to the control of the supply hydraulic pressure to a low value. However, since the supply hydraulic pressure is feedback-controlled so that the slip ratio becomes the predetermined value, in addition to the above effects, the forward clutch 30a can properly function as a torque fuse.

The apparatus further includes belt clamping pressure control means (S200 to S218) for controlling hydraulic pressure to be supplied to the belt 26c as clamping pressure, and the belt clamping pressure control means supplies the clamping pressure after subtracting a value corresponding to inertia torque of the engine (prime mover) 10 from the clamping pressure when the second value is set as the friction coefficient of the clutch 30a (S210, S216). With this, in addition to the above effects, the belt transmission torque corresponding to the inertia torque of the engine 10, etc., can be reduced and consequently, it becomes possible to further enhance the toughness of the belt 26c against slippage.

In the apparatus, the second clutch hydraulic pressure control means learns the second value in association with each of zones that are divided in accordance with surface pressure of the clutch (S22, S100 to S128). Specifically, the second value is learned in association with each of the zones (surface pressure zones) that are divided in accordance with the surface pressure of the clutch. With this, in addition to the above effects, it becomes possible to accurately learn the second value, i.e., the friction coefficient μ of the forward clutch 30a, thereby achieving the aforementioned effects more appropriately.

In the apparatus, the second clutch hydraulic pressure control means corrects a learning value of the friction coefficient in accordance with a temperature TATF of operating oil ATF of the CVT 26 (S114). With this, it becomes possible to learn the friction coefficient μ of the forward clutch 30a more accurately.

In the apparatus, the second clutch hydraulic pressure control means learns the second value through interpolation using a value in one of the divided zones where the learning is more frequently conducted (i.e., low surface pressure learning range). With this, since the second value is learned in association with the learning value in a zone where the learning is frequently conducted, similarly it becomes possible to learn the friction coefficient μ of the forward clutch 30a more accurately.

Further, this embodiment is configured to have an apparatus for controlling an automatic transmission (CVT) 26 connected to an engine (prime mover) 10 mounted on a vehicle 14 through a hydraulic clutch (forward clutch) 30a to change power of the prime mover in speed and transmit the power to a driven wheel 12 of the vehicle 14, in which a friction coefficient of the clutch is learned separately for each of zones that are divided in accordance with surface pressure of the clutch (S22, S100 to S128). With this, it becomes possible to accurately learn the friction coefficient of the hydraulic clutch (forward clutch) 30a. It should be noted that, in this case, the automatic transmission is not limited to the CVT 26 but may be one with different distinct gear ratios.

In the apparatus, a learning value of the friction coefficient is corrected in accordance with a temperature TATF of operating oil ATF of the automatic transmission (CVT) 26 (S114). With this, it becomes possible to learn the friction coefficient of the hydraulic clutch (forward clutch) 30a more accurately.

In the apparatus, the friction coefficient is learned through interpolation using a value in one of the divided zones where the learning is more frequently conducted. With this, since the friction coefficient is learned in association with the learning value in a zone where the learning is frequently conducted, similarly it becomes possible to learn the friction coefficient of the clutch more accurately.

It should be noted that although, in the foregoing, the learning value is calculated after the clutch μ calculation value (estimation μ) is normalized with the oil temperature TATF, the calculation value may be normalized after the learning value is calculated.

It should also be noted that although a skid occurrence is determined by checking as to whether one of slip ratios of the 5 wheels aligned in the vehicle's longitudinal direction and that of the wheels aligned in the vehicle's lateral direction is out of the predetermined range, the determination can be made through other methods.

It should also be noted that although the prime mover is exemplified by the engine, the prime mover may be a hybrid of an engine and electric motor or solely an electric motor.

INDUSTRIAL APPLICABILITY

According to this invention, in a CVT control apparatus, it is configured to determine whether it is in a predetermined operating condition where an operator is likely to apply a panic brake or the like; set a first value as a friction coefficient of a forward clutch when a vehicle is determined to be not in the predetermined operating condition and control supply of hydraulic pressure based on the set first value; and set a second value that is greater than the first value when the vehicle is determined to be in the predetermined operating condition and control supply of the hydraulic pressure based on the set second value. With this, even when excessive input torque is transmitted from the driven wheel upon panic braking or the like under the predetermined operating condition, since the desired supply hydraulic pressure is calculated to decrease with increasing friction coefficient, it becomes possible to calculate the desired supply hydraulic pressure to be a lower value compared to a case where it is not in the predetermined operating condition by setting the second value of greater than the first value as the friction coefficient.

DESCRIPTION OF SYMBOLS

10 Internal combustion engine (engine; prime mover), 12 Driven wheel, 14 Vehicle, 16 DBW mechanism, 24 Torque converter, 26 Continuous variable transmission (CVT; automatic transmission), 30 Forward and reverse switching mechanism, 30a Forward clutch (clutch), 46 Hydraulic circuit, 50 Crank angle sensor, 54 Throttle opening sensor, 66 Engine controller, 82 Wheel speed sensor, 84 Temperature sensor, 90 Shift controller

The invention claimed is:

1. An apparatus for controlling a belt type CVT connected to a prime mover mounted on a vehicle through a forward clutch to change power of the prime mover in speed and transmit the power to a driven wheel of the vehicle, comprising:
 an operating condition determiner adapted to determine whether it is in a predetermined operating condition where an operator is likely to apply a panic brake or the vehicle is likely running on a low friction road surface;
 a first clutch hydraulic pressure controller adapted to control supply of hydraulic pressure by setting a first value as a friction coefficient of the clutch when the vehicle is determined to be not in the predetermined operating condition and calculating a desired hydraulic pressure to be supplied to the clutch based on the set first value;
 a second clutch hydraulic pressure controller adapted to control supply of the hydraulic pressure by setting a second value that is greater than the first value as the friction coefficient when the vehicle is determined to be in the predetermined operating condition and calculating the desired hydraulic pressure to be supplied to the clutch based on the set second value; and
 a belt clamping pressure controller adapted to control hydraulic pressure to be supplied to the belt as clamping pressure and supply the clamping pressure after subtracting a value corresponding to inertia torque of the prime mover from the clamping pressure when the second value is set as the friction coefficient of the clutch.

2. The apparatus according to claim 1, wherein the second clutch hydraulic pressure controller feedback-controls the desired hydraulic pressure to be supplied to the clutch such that a slip ratio of the clutch becomes a predetermined value.

3. The apparatus according to claim 1, wherein the second clutch hydraulic pressure controller learns the second value in association with each of zones that are divided in accordance with surface pressure of the clutch.

4. The apparatus according to claim 3, wherein the second clutch hydraulic pressure controller corrects a learning value of the friction coefficient in accordance with a temperature of operating oil of the CVT.

5. The apparatus according to claim 3, wherein the second clutch hydraulic pressure controller learns the second value through interpolation using a value in one of the divided zones where the learning is more frequently conducted.

6. An apparatus for controlling a belt type CVT connected to a prime mover mounted on a vehicle through a forward clutch to change power of the prime mover in speed and transmit the power to a driven wheel of the vehicle, comprising:
 operating condition determining means for determining whether it is in a predetermined operating condition where an operator is likely to apply a panic brake or the vehicle is likely running on a low friction road surface;
 first clutch hydraulic pressure control means for controlling supply of hydraulic pressure by setting a first value as a friction coefficient of the clutch when the vehicle is determined to be not in the predetermined operating condition and calculating a desired hydraulic pressure to be supplied to the clutch based on the set first value;
 second clutch hydraulic pressure control means for controlling supply of the hydraulic pressure by setting a second value that is greater than the first value as the friction coefficient when the vehicle is determined to be in the predetermined operating condition and calculating the desired hydraulic pressure to be supplied to the clutch based on the set second value; and
 belt clamping pressure control means for controlling hydraulic pressure to be supplied to the belt as clamping pressure and supplying the clamping pressure after subtracting a value corresponding to inertia torque of the prime mover from the clamping pressure when the second value is set as the friction coefficient of the clutch.

7. The apparatus according to claim 6, wherein the second clutch hydraulic pressure control means feedback-controls the desired hydraulic pressure to be supplied to the clutch such that a slip ratio of the clutch becomes a predetermined value.

8. The apparatus according to claim 6, wherein the second clutch hydraulic pressure control means learns the second value in association with each of zones that are divided in accordance with surface pressure of the clutch.

9. The apparatus according to claim 8, wherein the second clutch hydraulic pressure control means corrects a learning value of the friction coefficient in accordance with a temperature of operating oil of the CVT.

10. The apparatus according to claim 8, wherein the second clutch hydraulic pressure control means learns the second value through interpolation using a value in one of the divided zones where the learning is more frequently conducted.

11. A method for controlling a belt type CVT connected to a prime mover mounted on a vehicle through a forward clutch to change power of the prime mover in speed and transmit the power to a driven wheel of the vehicle, comprising the steps of:

determining whether it is in a predetermined operating condition where an operator is likely to apply a panic brake or the vehicle is likely running on a low friction road surface;

controlling supply of hydraulic pressure by setting a first value as a friction coefficient of the clutch when the vehicle is determined to be not in the predetermined operating condition and calculating a desired hydraulic pressure to be supplied to the clutch based on the set first value;

controlling supply of the hydraulic pressure by setting a second value that is greater than the first value as the friction coefficient when the vehicle is determined to be in the predetermined operating condition and calculating the desired hydraulic pressure to be supplied to the clutch based on the set second value; and controlling hydraulic pressure to be supplied to the belt as clamping pressure and supplying the clamping pressure after subtracting a value corresponding to inertia torque of the prime mover from the clamping pressure when the second value is set as the friction coefficient of the clutch.

12. The method according to claim 11, wherein the step of controlling hydraulic pressure with the second value feedback-controls the desired hydraulic pressure to be supplied to the clutch such that a slip ratio of the clutch becomes a predetermined value.

13. The method according to claim 11, wherein the step of controlling hydraulic pressure with the second value learns the second value in association with each of zones that are divided in accordance with surface pressure of the clutch.

14. The method according to claim 13, wherein the step of controlling hydraulic pressure with the second value corrects a learning value of the friction coefficient in accordance with a temperature of operating oil of the CVT.

15. The method according to claim 13, wherein the step of controlling hydraulic pressure with the second value learns the second value through interpolation using a value in one of the divided zones where the learning is more frequently conducted.

\* \* \* \* \*